(12) United States Patent
Hotta et al.

(10) Patent No.: US 10,044,052 B2
(45) Date of Patent: Aug. 7, 2018

(54) GAS LIQUID SEPARATOR AND FUEL CELL SYSTEM

(71) Applicant: TOYOTA JIDOSHA KABUSHIKI KAISHA, Toyota-shi, Aichi-ken (JP)

(72) Inventors: Yutaka Hotta, Toyota (JP); Michitaro Itoga, Okazaki (JP); Tateki Takayama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 326 days.

(21) Appl. No.: 14/934,632

(22) Filed: Nov. 6, 2015

(65) Prior Publication Data
US 2016/0141693 A1    May 19, 2016

(30) Foreign Application Priority Data
Nov. 14, 2014    (JP) .................. 2014-231294

(51) Int. Cl.
H01M 8/04119    (2016.01)
B01D 45/08    (2006.01)

(52) U.S. Cl.
CPC ......... H01M 8/04164 (2013.01); B01D 45/08 (2013.01); H01M 2250/20 (2013.01); Y02T 90/32 (2013.01)

(58) Field of Classification Search
None
See application file for complete search history.

(56) References Cited

U.S. PATENT DOCUMENTS

2006/0086074 A1    4/2006    Kasuya et al.
2016/0126567 A1    5/2016    Yamaura

FOREIGN PATENT DOCUMENTS

| CA | 2 461 745 A1 | 4/2003 |
| CA | 2 911 738 A1 | 5/2016 |
| EP | 2 280 440 A1 | 2/2011 |
| JP | 2006-120503 | 5/2006 |
| JP | 2011-16039 | 1/2011 |

*Primary Examiner* — Sarah A. Slifka
(74) *Attorney, Agent, or Firm* — Finnegan, Henderson, Farabow, Garrett & Dunner, LLP

(57) ABSTRACT

The gas liquid separator comprises a gas liquid separator-forming portion formed in an end plate of a fuel cell to have an opening at an end face of the end plate and that constitutes part of the gas liquid separator; and a cover member located to cover the opening and is combined with the gas liquid separator-forming portion to constitute the gas liquid separator. The gas liquid separator-forming portion includes a first inner wall portion provided to serve as a flow path of the off-gas and form part of a reservoir and that is configured to include an off-gas outlet, to be connected with the opening and to be formed concave in a thickness direction of the end plate; and a surrounding portion protruded from the first inner wall portion along a first direction from the gas liquid separator-forming portion toward the cover member to surround the off-gas outlet.

5 Claims, 11 Drawing Sheets

GAS LIQUID SEPARATOR AND FUEL CELL SYSTEM

CROSS-REFERENCE TO RELATED APPLICATIONS

The present application claims priority from Japanese patent application P2014-231294A filed on Nov. 14, 2014, the entirety of disclosure of which is hereby incorporated by reference into this application.

BACKGROUND

Field

The present invention relates to a liquid gas separator that is configured to separate water included in an off-gas discharged from a fuel cell and discharge the separated water.

Related Art

An electrolyte membrane used for a fuel cell such as a polymer electrolyte fuel cell has high power generation performance in the highly moist state. A reactive gas supplied to the fuel cell may thus be humidified for this purpose. In order to improve the utilization rate of the reactive gas and suppress accumulation of water in the fuel cell, a circulation-type reactive gas supply mechanism may be provided to separate water from an off-gas discharged from the fuel cell and resupply the off-gas after separation of water as the reactive gas to the fuel cell. In this reactive gas supply mechanism, a gas liquid separator is used to separate water from the off-gas. For example, a proposed configuration of the gas liquid separator includes a tubular gas liquid separating portion and a reservoir that is located vertically below the gas liquid separating portion. The gas liquid separator of this proposed configuration separates water from an anode off-gas flowing into the gas liquid separator and temporarily stores the separated water in the reservoir while discharging the off-gas after separation of water (JP 2011-16039A). This gas liquid separator has an off-gas inlet conduit and an off-gas outlet conduit that are formed to pass through the gas liquid separator in its thickness direction.

A fuel cell system including the gas liquid separator of the above configuration may be mounted on a moving body such as a vehicle. In the case where the gas liquid separator is inclined, for example, during a run of the moving body on a slope, there is a likelihood that water accumulated in the reservoir enters the off-gas outlet conduit, an off-gas outlet of the gas liquid separator. Water entering the off-gas outlet of the gas liquid separator is included again in the off-gas, and the off-gas including such water is circulated. This results in decreasing the separation efficiency of water from the off-gas. There is accordingly a need to provide a technique that suppresses water separated from an off-gas from entering an off-gas outlet of a gas liquid separator.

SUMMARY

In order to solve at least part of the above problems, the invention may be implemented by any of the following aspects.

(1) According to one aspect of the invention, there is provided a gas liquid separator that is configured to separate water included in an off-gas discharged from a fuel cell and discharge the separated water. The fuel cell is mounted on a moving body and comprises a cell stack having a plurality of stacked unit cells and an end plate placed on an outer side of the cell stack in a stacking direction of the plurality of stacked unit cells. The gas liquid separator may comprise a gas liquid separator-forming portion that is formed in the end plate to have an opening at an opposite end face of the end plate in the stacking direction on an opposite side to the cell stack and that constitutes part of the gas liquid separator; and a cover member that is located to cover the opening of the gas liquid separator-forming portion and that is combined with the gas liquid separator-forming portion to constitute the gas liquid separator. The gas liquid separator-forming portion may include a first inner wall portion that includes an off-gas outlet formed therein, that is provided to serve as a flow path of the off-gas and form part of a reservoir in which the water separated from the off-gas is accumulated, and that is configured to be connected with the opening and to be formed concave in a thickness direction of the end plate; and a surrounding portion that is protruded from the first inner wall portion along a first direction from the gas liquid separator-forming portion toward the cover member to surround the off-gas outlet. The gas liquid separator of this aspect includes the surrounding portion that is protruded from the first inner wall portion along the first direction from the gas liquid separator-forming portion toward the cover member to surround the off-gas outlet. This configuration suppresses the separated water from entering the off-gas outlet of the gas liquid separator.

(2) In the gas liquid separator of the above aspect, an end face of the surrounding portion in the first direction may be away in an opposite direction to the first direction from an end face of the end plate in the first direction. In the gas liquid separator of this aspect, the end face of the surrounding portion in the first direction is away in the opposite direction to the first direction from the end face of the end plate in the first direction. This provides a relatively long distance from a bottom face of the cover member to the end face of the surrounding portion in the first direction. This configuration suppresses water accumulated on the bottom face of the cover member from entering the off-gas outlet according to inclination of the moving body. This accordingly suppresses reduction of the separation efficiency of water by the gas liquid separator.

(3) In the gas liquid separator of the above aspect, the surrounding portion may have an outer surface including an inclined surface that is located on a vertically lower side of the surrounding portion in a state that the moving body is at horizontal position and that is arranged to be approximately parallel to a bottom face of the reservoir opposed to the inclined surface. When the gas liquid separator is inclined, for example, according to the running state of the moving body, the gas liquid separator of this aspect causes the liquid level of water accumulated in the reservoir to be approximately parallel to the inclined surface on the vertically lower side of the surrounding portion. This provides a relatively large distance between the liquid level of accumulated water and the surrounding portion and thereby suppresses the accumulated water from entering the off-gas outlet. This accordingly suppresses reduction of the separation efficiency of water by the gas liquid separator.

(4) In the gas liquid separator of the above aspect, an off-gas inlet of the gas liquid separator may be formed in the first inner wall portion. The cover member may comprise a second inner wall portion that is formed concave in a thickness direction of the cover member to be connected with an opening of the cover member formed on a surface of the cover member opposed to the gas liquid separator-forming portion, that is located to be opposed to the first inner wall portion in the stacking direction and that is combined with the first inner wall portion to form the reservoir; and a drain flow path-forming portion that is configured to form a drain flow path to discharge water accumulated in the reservoir. In the gas liquid separator of this aspect, the gas liquid separator-forming portion includes both an inlet-forming portion and an outlet-forming portion, and the second inner wall portion of the cover member is formed concave in the thickness direction of the cover member. This controls the flow of the off-gas to an approximately U-shaped flow inside the reservoir. This increases the total flow path length and thereby increases the chance of separating water from the off-gas.

The invention may be implemented by any of various aspects other than the gas liquid separator described above, for example, a fuel cell system, an end plate for fuel cell, a cover member for gas liquid separator and a method of separating water included in an off-gas discharged from a fuel cell and discharging the separated water.

DESCRIPTION OF EMBODIMENTS

A. Embodiment

A1. System Configuration

Figure 1:
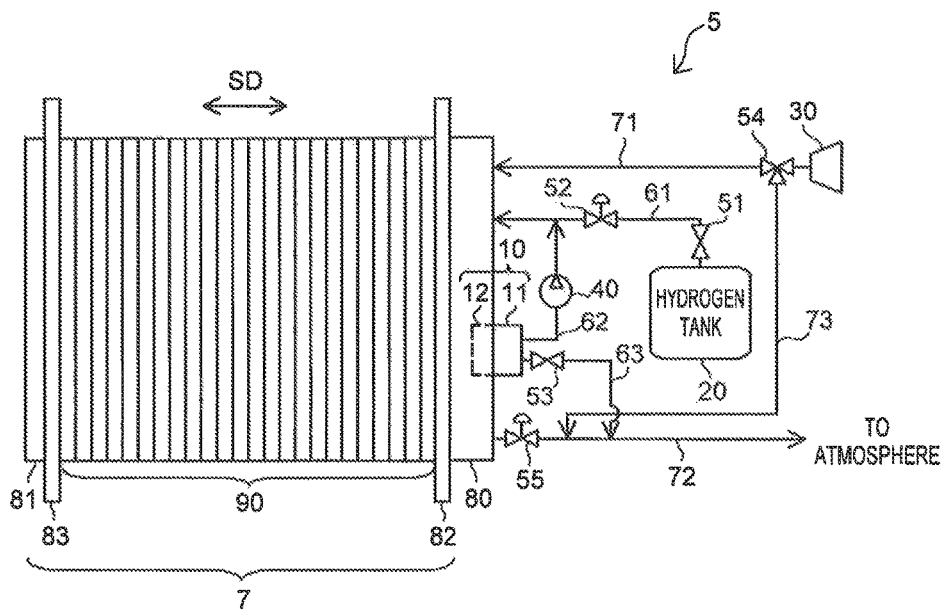
FIG. 1 is a block diagram illustrating the schematic configuration of a fuel cell system to which a gas liquid separator according to an embodiment of the invention is applied.

FIG. 1 is a block diagram illustrating the schematic configuration of a fuel cell system 5 to which a gas liquid separator according to an embodiment of the invention is applied. According to this embodiment, the fuel cell system 5 is mounted on a fuel cell vehicle and is used as a system for supplying electric power for driving. The fuel cell system 5 may be mounted and used on any moving body other than the fuel cell vehicle that requires a power supply for driving, such as an electric vehicle. The fuel cell system 5 includes a fuel cell 7, a gas liquid separator 10, a hydrogen tank 20, an air compressor 30, a circulation pump 40, a shutoff valve 51, an injector 52, an exhaust drain valve 53, a three-way valve 54, a pressure regulator 55, a fuel gas supply path 61, a fuel gas circulation path 62, a fuel gas discharge path 63, an oxidizing gas supply path 71, an oxidizing gas discharge path 72 and a bypass flow path 73. The configuration involved in circulating a cooling medium via the fuel cell 7 is omitted from the illustration of FIG. 1 for the convenience of explanation.

The fuel cell 7 includes a cell stack 90, a pair of terminal plates 82 and 83, a first end plate 80 and a second end plate 81. The cell stack 90 has a stacked structure of a plurality of unit cells in a stacking direction SD. The pair of terminal plates 82 and 83 are located to be in contact with the respective end faces of the cell stack 90 in the stacking direction SD. The first end plate 80 is located outside of the terminal plate 82 in the stacking direction SD. The second end plate 81 is located outside of the terminal plate 83 in the stacking direction SD. Each of the unit cells constituting the cell stack 90 generates electric power through an electrochemical reaction of hydrogen as a fuel gas supplied to an anode catalyst electrode layer with oxygen included in the air as an oxidizing gas supplied to a cathode catalyst electrode layer. The anode and cathode catalyst electrode layers are arranged across a solid polymer electrolyte membrane. Each of the catalyst electrode layers may be configured to include carbon particles with a catalyst such as platinum (Pt) supported thereon and an electrolyte. A gas diffusion layer made of a porous material is placed outside of each of the anode and cathode catalyst electrode layers. The porous material may be, for example, a carbon porous material such as carbon paper or carbon cloth or a metal porous material such as metal mesh or metal foam. Manifolds are formed along the stacking direction SD inside of the fuel cell 7 to make respective flows of the fuel gas, the oxidizing gas and the cooling medium. The two terminal plates 82 and 83 are plate-like members serving as general electrodes of the fuel cell 7. The first end plate 80 has a substantially plate-like appearance having its thickness direction identical with the stacking direction SD. The first end plate 80 serves, in combination with the second end plate 81, to have the cell stack 90 and the pair of terminal plates 82 and 83 placed therebetween, serves to provide flow paths for supplying the fuel gas, the oxidizing gas and the cooling medium to corresponding manifolds in the cell stack 90 and for discharging the fuel gas, the oxidizing gas and the cooling medium from corresponding manifolds in the cell stack 90, and serves to constitute part of the gas liquid separator 10. Like the first end plate 80, the second end plate 81 has a substantially plate-like appearance having its thickness direction identical with the stacking direction SD. The second end plate 81 serves, in combination with the first end plate 80, to have the cell stack 90 and the pair of terminal plates 82 and 83 placed therebetween. Unlike the first end plate 80, however, the second end plate 81 neither serve to provide flow paths for supplying and discharging the fuel gas, the oxidizing gas and the cooling medium nor serves to constitute part of the gas liquid separator 10.

The gas liquid separator 10 is connected with a fuel gas discharge manifold in the cell stack 90 to separate and discharge water included in an off gas discharged from the manifold and to supply the fuel gas after separation of water to the fuel gas circulation path 62. The gas liquid separator 10 is comprised of a gas liquid separator-forming portion 12 and a cover member 11. The gas liquid separator-forming portion 12 is provided inside of the first end plate 80. The gas liquid separator-forming portion 12 has an appearance that is open at an end face of the first end plate 80 on an outer side in the stacking direction SD (hereinafter referred to as "cover opposing surface") and is concave in the thickness direction of the first end plate 80 or more specifically in a direction from the first end plate 80 toward the terminal plate 82 along the stacking direction SD. The cover member 11 is located to be in contact with the cover opposing surface of the first end plate 80 and cover the opening of the gas liquid separator-forming portion 12. The cover member 11 has an appearance that is open at a surface opposed to the gas liquid separator-forming portion 12 and is convex in the thickness direction or more specifically in a direction from the gas liquid separator-forming portion 12 toward the cover member 11 along the stacking direction SD. The detailed configuration of the gas liquid separator 10 will be described later.

The hydrogen tank 20 is configured to store high-pressure hydrogen and supply hydrogen gas as the fuel gas to the fuel cell 7. The air compressor 30 is configured to supply the air as the oxidizing gas to the fuel cell 7. The circulation pump 40 is located in the fuel gas circulation path 62. The circulation pump 40 is configured to feed the fuel gas from the gas liquid separator 10, i.e., the fuel gas after separation of water, to the fuel gas supply path 61. The shutoff valve 51 is located in the vicinity of a fuel gas outlet, of the hydrogen tank 20. The shutoff valve 51 is configured to switch between supply and stop of supply of the hydrogen gas from the hydrogen tank 20. The injector 52 is located in the fuel gas supply path 61. The injector 52 is configured to adjust the supply amount and the pressure of the hydrogen gas to the fuel cell 7. The exhaust drain valve 53 is located in the fuel gas discharge path 63. The exhaust drain valve 53 is configured to switch between discharge and stop of discharge of water and an off gas from the gas liquid separator 10. Opening and closing of the exhaust drain valve 53 is controlled by a controller (not shown). For example, the exhaust drain valve 53 is opened and closed regularly at predetermined intervals according to operating conditions, such as the vehicle speed of the fuel cell vehicle and the depression amount of an accelerator pedal. The three-way valve 54 is located in the oxidizing gas supply path 71. The three-way valve 54 is configured to receive the total flow of the air supplied from the air compressor 30 and adjust a flow rate that is to be supplied to the oxidizing gas supply path 71 and a flow rate that is to be supplied to the bypass flow path 73. The pressure regulator 55 is located in the oxidizing gas discharge path 72. The pressure regulator 55 is configured to regulate a pressure on the cathode discharge side of the fuel cell 7 or the back pressure.

The following describes the flow configuration of the fuel gas in the fuel cell system 5. The hydrogen gas fed from the hydrogen tank 20 is supplied through the fuel gas supply path 61 to the fuel cell 7. An anode off-gas that is an off gas discharged from the fuel cell 7 is flowed to the gas liquid separator 10, which serves to separate at least part of water included in the off gas. The off gas after separation of water, i.e., the fuel gas, is returned via the fuel gas circulation path 62 and the circulation pump 40 to the fuel gas supply path 61 and is resupplied to the fuel cell 7. Part of the off gas flowed into the gas liquid separator 10, along with water separated from the off gas, is discharged from the gas liquid separator 10 via the exhaust drain valve 53 to the fuel gas discharge path 63. The fuel gas discharge path 63 is connected with the oxidizing gas discharge path 72, so that water and the anode off-gas discharged to the fuel gas discharge path 63 are released, along with water and an cathode off-gas discharged from the fuel cell 7, through the oxidizing gas discharge path 72 to the atmosphere. The fuel gas discharge path 63 communicates with the oxidizing gas discharge path 72 that is open to the atmosphere, so that the internal pressure of the fuel gas discharge path 63 is the atmospheric pressure. A back pressure higher than the atmospheric pressure is applied to inside of the gas liquid separator 10. Accordingly, there is a pressure difference across the exhaust drain valve 53. In the case where the exhaust drain valve 53 is opened, the off gas is discharged from the liquid gas separator 10 to the fuel gas discharge path 63 due to this pressure difference.

The following describes the flow configuration of the oxidizing gas in the fuel cell system 5. The air fed from the air compressor 30, i.e., the compressed air, is supplied through the oxidizing gas supply path 71 to the fuel cell 7. The supply amount of the air to the fuel cell 7 is adjustable by regulating the valve-opening position of the three-way valve 54. Water and a cathode off-gas that is an off gas discharged from the fuel cell 7 are discharged via the pressure regulator 55 to the oxidizing gas discharge path 72. The oxidizing gas discharge path 72 is connected with the fuel gas discharge path 63 as described above and is also connected with the bypass flow path 73, so that the cathode off-gas discharged from the fuel cell 7 is released, along with the anode off-gas and water discharged through the fuel has discharge path 63 and the air discharged through the bypass flow path 73, to the atmosphere.

Like the exhaust drain valve 53 described above, the operations of the air compressor 30, the circulation pump 40 and the other valves are controlled by a controller (not shown). This controller may include, for example, a read only memory (ROM) that stores control programs, a central processing unit (CPU) that reads and executes the control programs from the ROM, and a random access memory (RAM) that is used as the work area of the CPU.

A2. Configuration of Gas Liquid Separator

Figure 2:
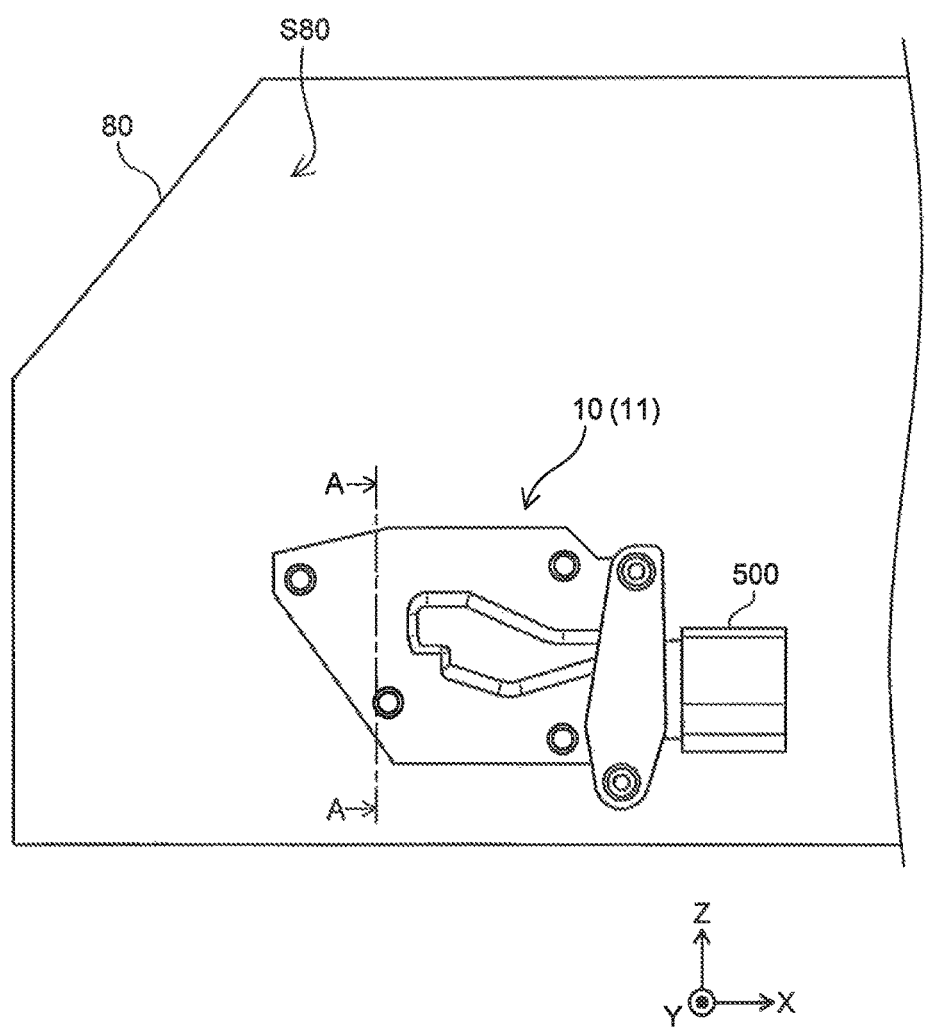
FIG. 2 is a front view illustrating the appearance configuration of the gas liquid separator.
Figure 3:
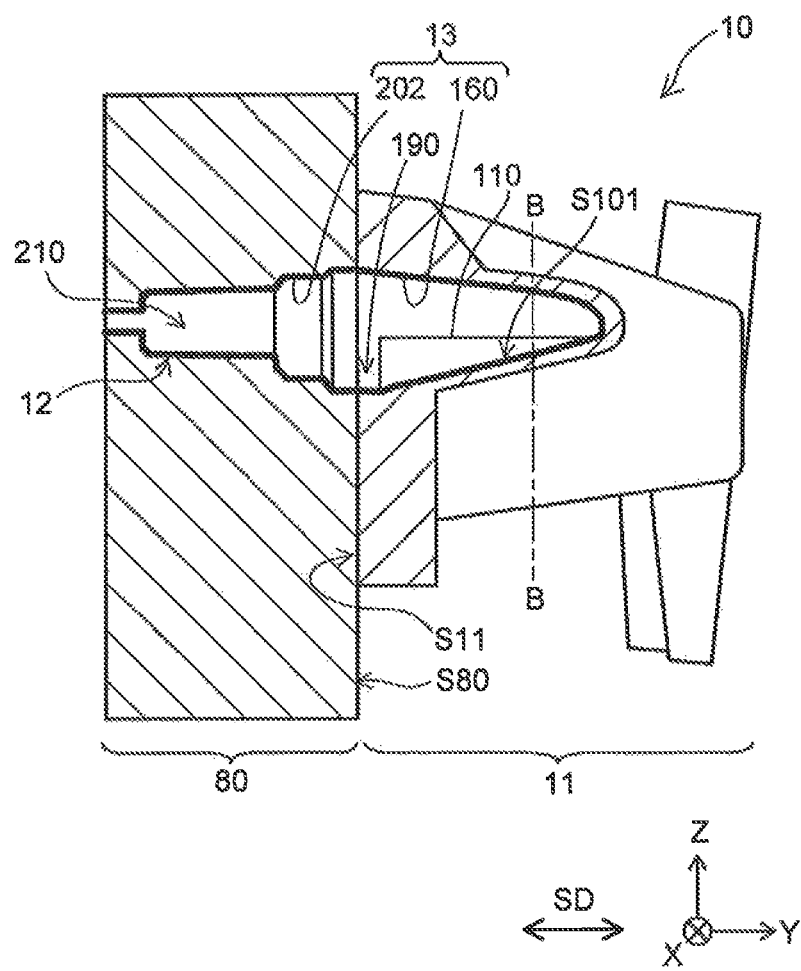
FIG. 3 is a sectional view taken on a line A-A in FIG. 2.

FIG. 2 is a front view illustrating the appearance configuration of the gas liquid separator 10, FIG. 3 is a sectional view taken on a line A-A in FIG. 2. The front view of FIG. 2 illustrates the gas liquid separator 10 viewed in a direction from the first end plate 80 toward the terminal plate 82 and the cell stack 90. As described above, part of the gas liquid separator 10 is formed in the first end plate 80. Part of the first end plate 80 is accordingly illustrated in FIGS. 2 and 3. A valve unit 500 connected with the gas liquid separator 10 is also illustrated in FIG. 2. The sectional view of FIG. 3 illustrates an A-A section of FIG. 2. Unless otherwise specified, these and subsequent drawings illustrate the respective components of the fuel cell system 5 and the gas liquid separator 10 in the state that the fuel cell vehicle with the fuel cell system 5 mounted thereon is placed on a horizontal plane, i.e., in the state that the fuel cell vehicle is at horizontal position. In these and subsequent drawings, X axis and Y axis are parallel to the horizontal plane, and Z axis is parallel to the vertical direction. +Z-axis direction indicates vertically upward direction, and −Z-axis direction indicates vertically downward direction, +X-axis direction indicates forward. Direct ion of the fuel cell vehicle, and −X-axis direction indicates rearward direction of the fuel cell vehicle. According to this embodiment, the stacking direction SD is parallel to the Y axis.

As shown in FIG. 2, the cover member 11 is mounted to a cover opposing surface S80 of the first end plate 80 by means of bolts. The valve unit 500 is connected with a +X-axis direction end of the cover member 11. The valve unit 500 includes the exhaust drain valve 53 and a drive portion (not shown) to open and close the exhaust drain valve 53. The connecting part between the cover member 11 and the valve unit 500 will be described later in detail. The cover member 11 has an approximately rectangular front configuration having the longitudinal direction along the X-axis direction and the thickness direction parallel to the Y-axis direction.

As shown in FIG. 3, the gas liquid separator-forming portion 12 is formed inside of the first end plate 80. The gas liquid separator-forming portion 12 has a first inner wall portion 202. The gas liquid separator-forming portion 12 has a gas supply path 210 formed to be extended in the thickness direction of the first end plate 80, i.e., in the Y-axis direction. The first inner wall portion 202 is connected with an opening formed at the cover opposing surface 880 and is formed concave in the thickness direction of the first end plate 80, i.e., in the Y-axis direction. The first inner wall portion 202 is combined with a second inner wall portion 160 of the cover member 11 described below to form a reservoir 13. The reservoir 13 has an approximately spherical appearance shape that is flattened in the Z-axis direction. The reservoir 13 serves as a flow path of the anode off-gas and also serves to temporarily store water separated from the anode off-gas. A −Y-axis direction end of the gas supply path 210 is extended to a terminal plate 82-side end face of the first end plate 80. A +Y-axis direction end of the gas supply path 210 communicates with the inner cavity of the reservoir 13. The gas supply path 210 is arranged to introduce the anode off-gas discharged from the cell stack 90 through the terminal plate 82 to the reservoir 13.

The cover member 11 has an opening formed at a surface S11 opposed to the cover opposing surface 880 of the first end plate 80 (hereinafter referred to as "forming-portion opposing surface"). The cover member 11 has a second inner wall portion 160. The second inner wall portion 160 is connected with the opening formed at the forming-portion opposing surface S11 and is formed concave in the thickness direction of the cover member 11 (Y-axis direction). The shape and the dimensions of the opening formed at the forming-portion opposing surface S11 of the cover member 11 are identical with the shape and the dimensions of the opening formed at the cover opposing surface S80 of the gas liquid separator-forming portion 12. The cover member 11 is located relative to the gas liquid separator-forming portion 12, such that these two openings are opposed to each other. This causes the first inner wall portion 202 and the second inner wall portion 160 to be connected with each other and form the reservoir 13 described above. The cover member 11 has a protruded section 110 in the reservoir 13. The protruded section 110 is protruded upward from a bottom face of the second inner wall portion 160. A −Y-axis direction end face of the protruded section 110 is away in the +Y-axis direction from the forming-portion opposing surface 811 of the cover member 11. Accordingly a clearance 190 is formed between the −Y-axis direction end face of the protruded section 110 and the forming-portion opposing surface S11. The protruded section 110 and the clearance 190 will be described later in detail. The cover member 11 has an inclined surface S101 on part of the bottom face of the second inner wall portion 160 or, in other words, on part of the bottom face of the reservoir 13. This inclined surface S101 is gradually inclined downward along a direction from the cover member 11 toward the gas liquid separator-forming portion 12, i.e., along the −Y-axis direction.

Figure 4:
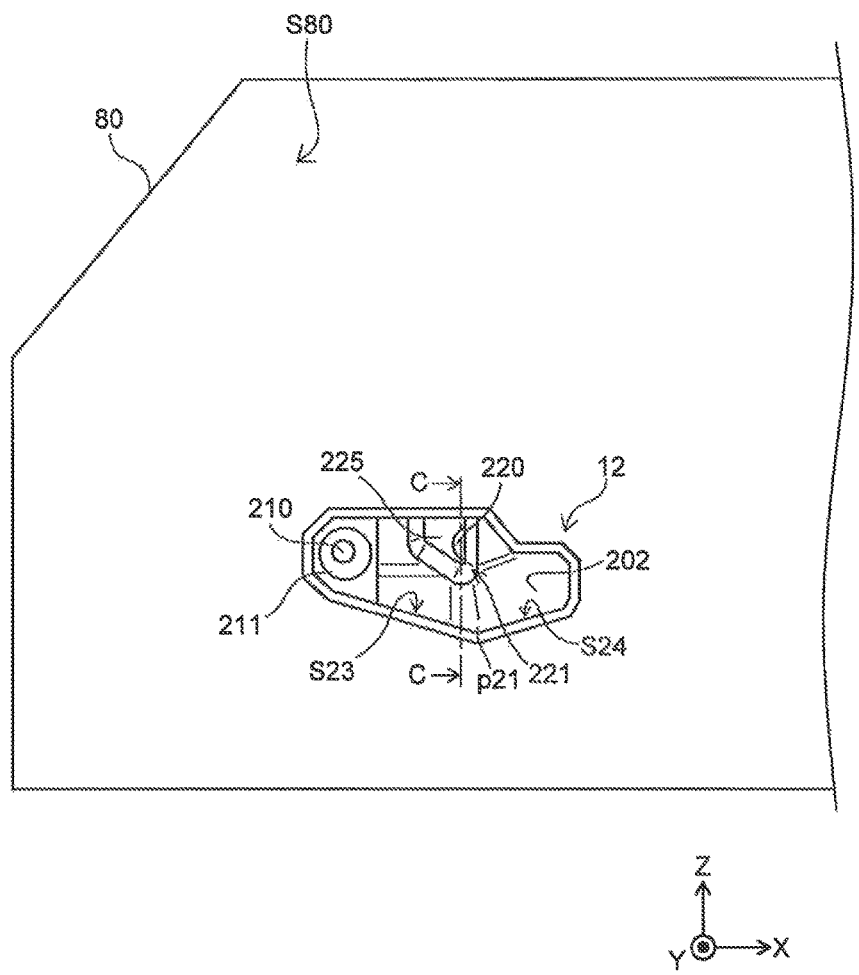
FIG. 4 is a front view illustrating the configuration of a gas liquid separator-forming portion.
Figure 5:
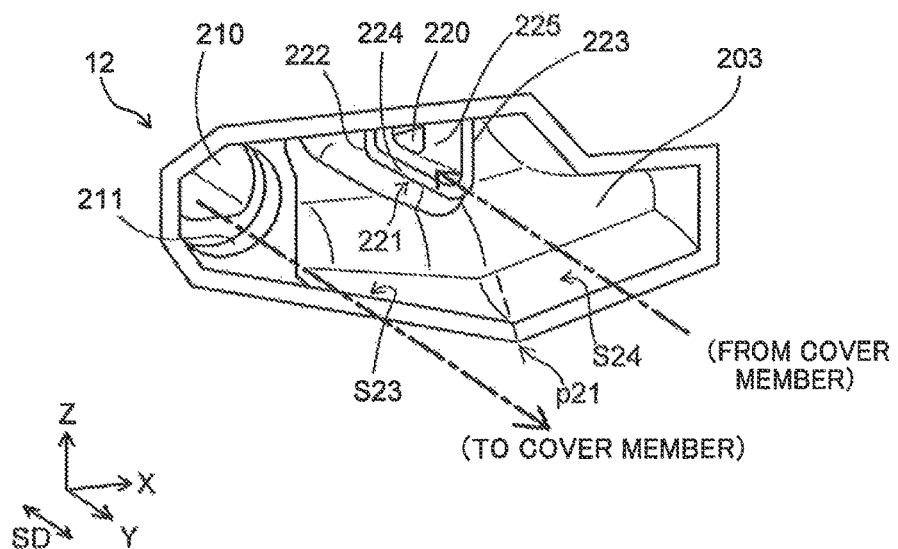
FIG. 5 is a perspective view illustrating the configuration of the gas liquid separator-forming portion.

FIG. 4 is a front view illustrating the configuration of the gas liquid separator-forming portion 12. FIG. 5 is a perspective view illustrating the configuration of the gas liquid separator-forming portion 12. FIG. 4 illustrates the gas liquid separator-forming portion 12 exposed by detachment of the cover member 11 from the state shown in FIG. 2.

The gas liquid separator-forming portion 12 includes a gas supply path-forming portion 211 and a surrounding portion 221, in addition to the first inner wall portion 202 described above. The gas supply path-forming portion 211 is located on a −X-axis direction end of the gas liquid separator-forming portion 12 to form the gas supply path 210. More specifically, the gas supply path forming portion 211 is extended parallel to the Y-axis direction or the stacking direction SD to have an inner wall of a circular cross section, which forms the gas supply path 210. A +Y-axis direction end of the gas supply path-forming portion 211 serves as a gas inlet to the reservoir 13. The off-gas flowing in through the gas inlet runs toward the cover member 11 as indicated in FIG. 5 with dash lined arrow.

The surrounding portion 221 is protruded in the +Y-axis direction from a −Y-axis direction end of the first inner wall portion 202 to surround an off-gas outlet 220. The surrounding portion 221 has an approximately trapezoidal cross section and has a pipe like appearance shape extended parallel to the Y-axis direction. The surrounding portion 221 includes a first wall section 222, a second wall section 223 and a third wall section 224. The first wall section 222 is protruded downward from the ceiling of the first inner wall portion 202 and is located nearly parallel to a Y-Z plane. The second wall section 223 is located parallel to the first wall section 222 at a position away in the +X-axis direction from the first wall section 222. The third wall section 224 is provided to connect a lower end of the first wall section 222 with a lower end of the second wall section 223. The length of the second wall section 223 in the vertical direction (Z-axis direction) is larger than the length of the first wall section 222 in the vertical direction. Accordingly, the third wall section 224 is inclined gradually downward along the +X-axis direction. These three wall sections 222 to 224 and the ceiling of the first inner wall portion 202 form a discharge flow path 225. The discharge flow path 225 defines the flow of the off-gas from the reservoir 13 toward the off-gas outlet 220 in the −Y-axis direction. As shown in FIGS. 4 and 5, the off-gas outlet 220 is formed at a boundary between a −Y-axis direction end of the discharge flow path 225 and an inner part of the second wall section 223.

Figure 6:
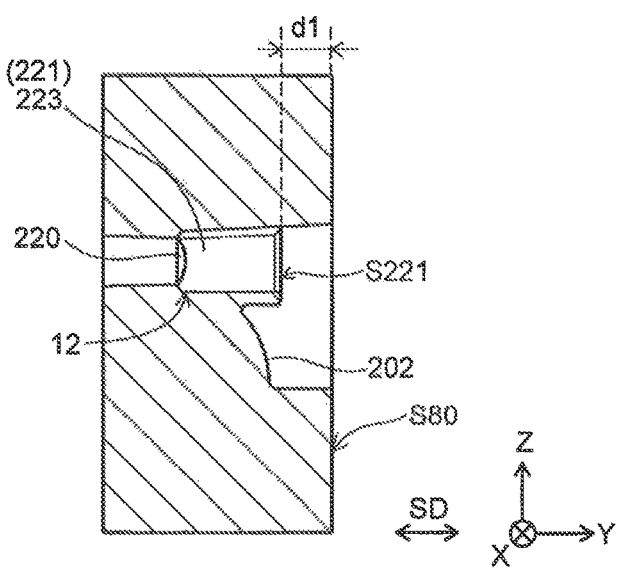
FIG. 6 is a sectional view illustrating a C-C section of the gas liquid separator-forming portion shown in FIG. 4.

FIG. 6 is a sectional view illustrating a C-C section of the gas liquid separator-forming portion 12 shown in FIG. 4. As shown in FIG. 6, a +Y-axis direction end face S221 of the surrounding portion 221 is away in the −Y-axis direction by a distance d1 that is not zero from the cover opposing surface S80 that is the +Y-axis direction end face of the first end plate 80. In other words, the end face. 221 of the surrounding portion 221 is not protruded from the cover opposing surface S80 toward the cover member 11. Locating the +Y-axis direction end face S221 of the surrounding portion 221 to be away in the −Y-axis direction from the cover opposing surface S80 suppresses water accumulated on the cover member 11 side from entering the discharge flow path 225.

As shown in FIGS. 4 and 5, a bottom face or a −Z-axis direction-side face of the first inner wall portion 202 includes a first surface S23 and a second surface S24. Both these two surfaces S23 and S24 are in contact with a bottom face of the cover member 11 or more specifically a bottom face of the second inner wall portion 160. The first surface S23 is located on the −X-axis direction side of the second surface S24 to be connected with the second surface S24. The first surface S23 is located vertically below the surrounding portion 221. The first surface S23 is inclined gradually downward along the +X-axis direction. The second surface S24 is, on the other hand, inclined gradually upward along the +X-axis direction. Accordingly, as shown in FIG. 4, the first surface S23 and the second surface S24 are arranged to form an approximately V-shaped cross section in the −Y-axis direction. A connecting part of the first surface S23 and the second surface S24 indicated by a line includes a lowermost point p21 of the gas liquid separator-forming portion 12 in the state that the fuel cell vehicle is at horizontal position. According to this embodiment, the first surface S23 is formed to be nearly parallel to the third wall section 224 of the surrounding portion 221. The term "nearly parallel" herein means that the angle between a plane extended from the first surface 823 and a plane extended from the third wall section 224 is in a range between 0 degree and 20 degrees, inclusive. The following describes the reason why the first surface S23 is arranged to be nearly parallel to the third wall section 224 of the surrounding portion 221.

Figure 7A:
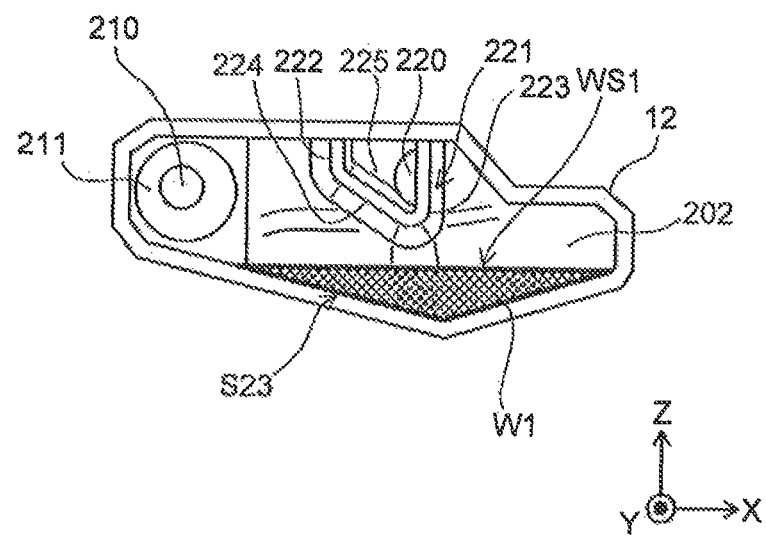
FIG. 7A is a diagram illustrating the positional relationship between water accumulated in a reservoir and a surrounding portion in the state that a fuel cell vehicle is at horizontal position.
Figure 7B:
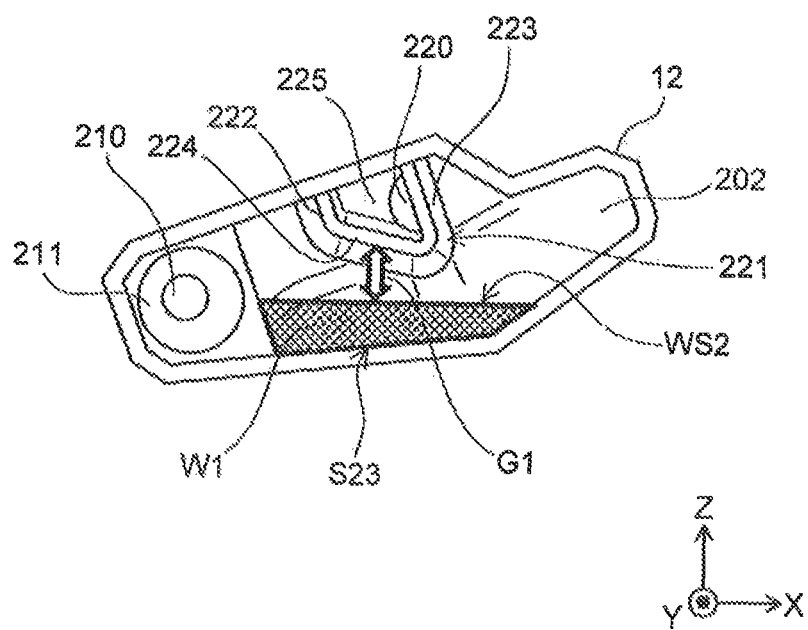
FIG. 7B is a diagram illustrating the positional relationship between water accumulated in the reservoir and the surrounding portion in the state that the fuel cell vehicle is not at horizontal position.

FIG. 7A is a diagram illustrating the positional relationship between water accumulated in the reservoir 13 and the surrounding portion 221 in the state that the fuel cell vehicle is at horizontal position. FIG. 7B is a diagram illustrating the positional relationship between water accumulated in the reservoir 13 and the surrounding portion 221 in the state that the fuel cell vehicle is not at horizontal position. FIG. 7A shows the positional relationship between water accumulated in the reservoir 13 and the surrounding portion 221, for example, when the fuel cell vehicle runs on a horizontal plane. FIG. 7B shows the positional relationship between water accumulated in the reservoir 13 and the surrounding portion 221, for example, when the fuel cell vehicle runs on an ascending slope.

As shown in FIG. 7A, water W1 separated from the off-gas is accumulated on the bottom of the gas liquid separator-forming portion 12. In this state, liquid level WS1 is lower than a lower end of the surrounding portion 221 or more specifically lower than the intersection between the second wall section 223 and the third wall section 224.

When the fuel cell vehicle with water accumulated in this manner runs on an ascending slope, the gas liquid separator 10 is placed such that a +X-axis direction end of the gas liquid separator-forming portion 12 is located vertically above its −X-axis direction end as shown in FIG. 7B. The first surface S23 in this state becomes nearly horizontal, compared with the first surface S23 in the state of FIG. 7A. Accordingly, most part of the water W1 on the bottom of the gas liquid separator-forming portion 12 is located above the first surface S23. The first surface S23 is nearly parallel to the third wall section 224, so that liquid level WS2 of the water W1 becomes nearly parallel to the third wall section 224. Accordingly, the length of a clearance G1 between the third wall section 224 and the liquid level WS2 in the Z-axis direction is almost equal at any position. This prevents the liquid level WS2 from coming into contact with the third wall section 224 and thereby suppresses the water W1 from being sucked through the discharge flow path 225 into the off-gas outlet 220.

Figure 8:
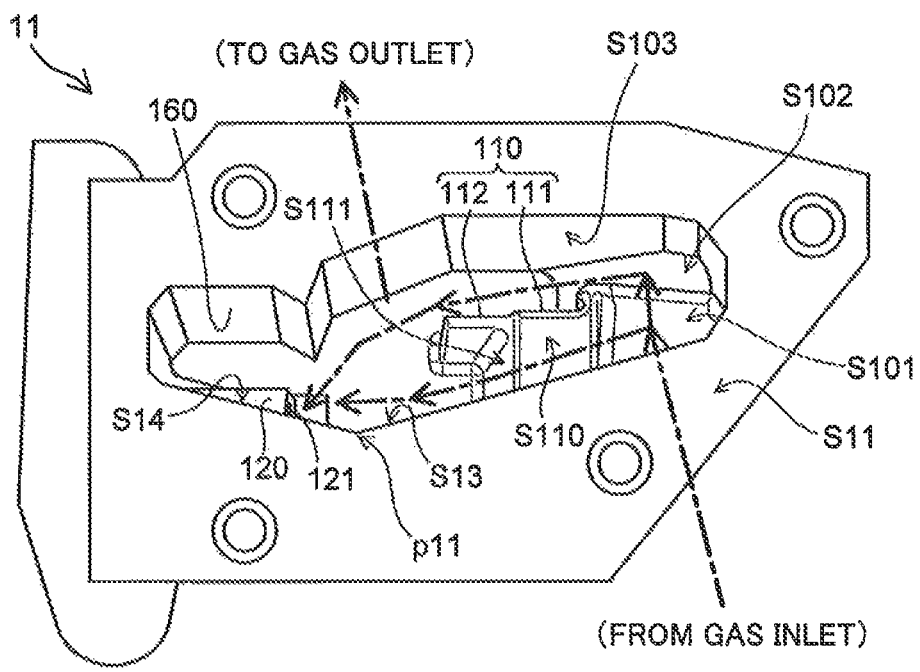
FIG. 8 is a plan view illustrating the configuration of a cover member.
Figure 9:
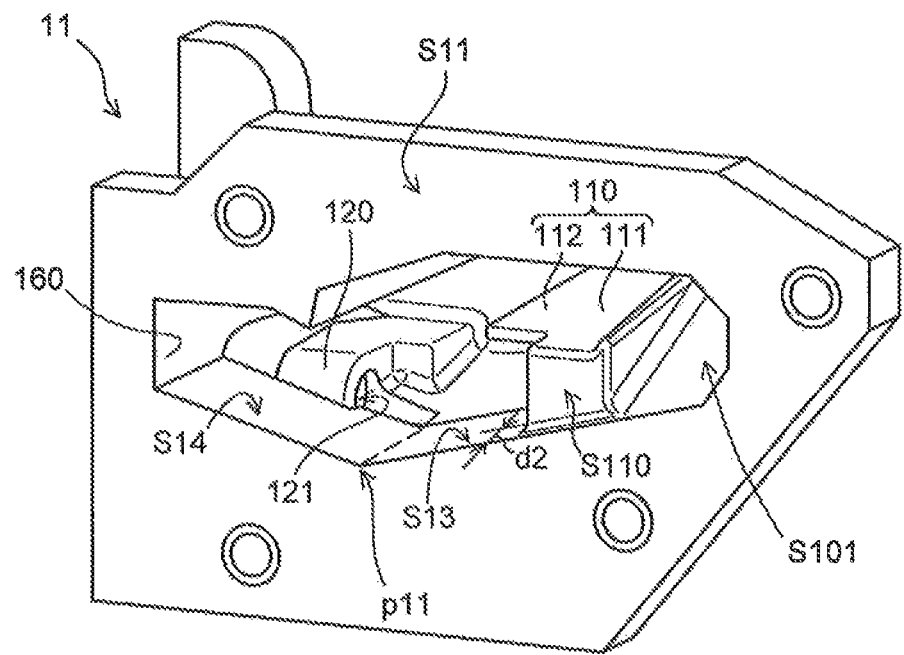
FIG. 9 is a perspective view illustrating the configuration of the cover member.

FIG. 8 is a plan view illustrating the configuration of the cover member 11. FIG. 9 is a perspective view illustrating the configuration of the cover member 11. FIGS. 8 and 9 illustrate the cover member 11 before being mounted to the first end plate 80.

The cover member 11 includes a drain flow path-forming portion 120, in addition to the second inner wall portion 160, the protruded section 110 and the inclined surface S101 described above. The protruded section 110 is located between a position in the second inner wall portion 160 of the cover member 11 opposed to the gas inlet and a drain outlet 121 formed in the drain flow path-forming portion 120. The protruded section 110 includes a thick wall portion 111 and a thin wall portion 112, which are integrated with each other. The thick wall portion 111 has a larger length in the Z-axis direction than the thin wall portion 112 and is formed to be in contact with the bottom face of the second inner wall portion 160. As shown in FIG. 9, a −Y-axis direction end face S110 of the thick wall portion 111 is away in the +Y-axis direction by a distance d2 from the forming-portion opposing surface S11 that is the −Y-axis direction end face of the entire cover member 11. The thin wall portion 112 has a thin plate-like appearance shape and is located on the +X-axis direction side of the thick wall portion 111. A +Z-axis direction end face of the thin wall portion 112 is integrated with a +Z-axis direction end face of the thick wall portion 111 to form one surface or more specifically a ceiling surface. A lower end or a −Z-axis direction end face of the thin wall portion 112 is not in contact with the bottom face of the second inner wall portion 160. The thin wall portion 112 is accordingly supported by the thick wall portion 111. The ceiling surface of the thick wall portion 111 and the thin wall portion 112 is arranged not to be in contact with the second inner wall portion 160. Accordingly, a clearance is formed between the protruded section 110 and a ceiling surface of the second inner wall portion 160.

The bottom face of the second inner wall portion 160 includes a third surface S13 and a fourth surface S14. The third surface S13 is arranged to be in contact with the first surface S23 of the gas liquid separator-forming portion 12 described above to form one plane. Similarly, the fourth surface S14 is arranged to be in contact with the second surface S24 of the gas liquid separator-forming portion 12 described above to form one plane. Accordingly, the third surface S13 and the fourth surface S14 are arranged to form an approximately V-shaped cross section in the +Y-axis direction, like the approximately V-shaped cross section in the −Y-axis direction of the first surface S23 and the second surface S24 described above. A connecting part of the third surface S13 and the fourth surface S14 indicated by a line includes a lowermost point p11 of the cover member 11 in the state that the fuel cell vehicle is at horizontal position. This lowermost point p11 corresponds to the lowermost point p21 of the gas liquid separator-forming portion 12 described above in the Y-axis direction. The protruded section 110 described above is arranged to be in contact with the third surface S13.

The inclined surface S101 is located on the −X-axis direction side of the protruded section 110 to be in contact with a lower end of the protruded section 110. The inclined surface S101 is opposed to the gas inlet formed in the gas liquid separator-forming portion 12. As described above, the inclined surface S101 is inclined gradually downward along the direction from the cover member 11 toward the gas liquid separator-forming portion 12 or along the −Y-axis direction in other words, the inclined surface S101 is inclined gradually upward along the direction from the gas liquid separator-forming portion 12 toward the cover member 11 or along the +Y-axis direction. A lower end or a −Y-axis direction end of the inclined surface S101 is arranged to be in contact with a bottom face of the clearance 190 shown in FIG. 3.

The drain flow path-forming portion 120 is arranged to be in contact with the bottom face of the second inner wall portion 160. A drain flow path (not shown) extended in the +X-axis direction is formed inside of the drain flow path-forming portion 120. The drain outlet 121 is formed at a −X-axis direction end of the drain flow path-forming portion 120. The drain outlet 121 is located near to the bottom face of the second inner wall portion 160 to be exposed to inside of the reservoir 13. The detailed configuration of the drain flow path will be described later. Water accumulated in the reservoir 13 is discharged from the drain outlet 121 to the drain flow path.

The flow of the off-gas in the reservoir 13 is described with reference to FIG. 8. Most part of the off-gas flowing from the gas inlet into the reservoir 13 hits against the inclined surface S101, moves upward along the inclined surface S101 and flows in the approximately +X-axis direction across an area surrounded by a +Y-axis direction wall S102 and a +Z-axis direction wall or ceiling surface S103 of the second inner wall portion 160 and an upper face of the protruded section 110. Providing the protruded section 110 suppresses the off-gas moving upward along the inclined surface S101 from flowing toward a bottom face of the reservoir 13, i.e., from flowing in the −Z-axis direction. Most part of the off-gas passing through the upper face of the protruded section 110 goes to the gas liquid separator-forming portion 12, flows through the discharge flow path 225 and is discharged from the off-gas outlet 220. The remaining part of the off-gas passing through the upper face of the protruded section 110 is discharged with water from the drain outlet 121 to the drain flow path. Very small part of the off-gas flowing from the gas inlet of the gas liquid separator-forming portion 12 into the reservoir 13 moves downward along the inclined surface S101, flows in the +X-axis direction across the clearance 190 shown in FIG. 3 and is discharged from the off-gas outlet 220 or the drain outlet 121.

As described above, the off-gas entering the gas liquid separator 10 flows in the reservoir 13 with changing its flow direction by hitting against the wall surface of the reservoir 13 or the ceiling surface of the protruded section 110 and is discharged from the gas liquid separator 10. Water included in the off-gas is taken off when the off-gas hits against the wall surface of the reservoir 13 or the ceiling surface of the protruded section 110, and flows downward along the respective wall surfaces. For example, liquid water on the inclined surface S101 flows downward along the inclined surface S101. The lower end of the inclined surface S101 is connected with the lower end of the clearance 190, and the third surface S13 located vertically below the clearance 190 is inclined downward along the +X-axis direction. Water flowing downward along the inclined surface S101 accordingly moves in the +X-axis direction across the clearance 190 and goes to the drain outlet 121. Water taken off by wall surfaces of the second inner wall portion 160 that are different from the inclined surface S101 flows downward along the respective wall surfaces, is accumulated on the bottom of the reservoir 13 and is discharged from the drain outlet 121 to the drain flow path.

The drain outlet 121 is formed in the cover member 11, while the off-gas outlet 220 of the reservoir 13 is formed in the gas liquid separator-forming portion 12. Additionally, the drain outlet 121 is located at the bottom of the reservoir 13, while the off-gas outlet 220 is located in the vicinity of the ceiling of the reservoir 13. According to the embodiment, this configuration provides a relatively long distance between the drain outlet 121 and the off-gas outlet 220 and suppresses water accumulated in the vicinity of the drain outlet 121 from flowing into the off-gas outlet 220. Providing the protruded section 110 suppresses the off-gas flowing into the reservoir 13 from linearly moving toward the bottom of the reservoir 13. This suppresses the off-gas from directly colliding with the surface of water accumulated at the bottom of the reservoir 13 and thereby suppresses water from being splashed and flowing into the off-gas outlet 220.

In the gas liquid separator 10, the gas inlet and the off-gas outlet 220 of the reservoir 13 are both provided on the gas liquid separator-forming portion 12-side, while the second inner wall portion 160 of the cover member 11 opposed to the gas inlet and the off-gas outlet 220 is formed concave in the +Y-axis direction. This controls the flow of the off-gas to an approximately U-shaped flow in the reservoir 13. The approximately U-shaped flow is the flow of the off-gas that flows from the gas inlet toward the cover member 11, moves in the approximately +X-axis direction with hitting against the wall surfaces of the reservoir 13, moves from the cover member 11 toward the gas liquid separator-forming portion 12 and is discharged from the off-gas outlet 220. According to this embodiment, controlling the flow of the off-gas to the approximately U-shaped flow in the reservoir 13 as described above relatively increases the total flow path length of the off-gas in the reservoir 13 and thereby increases the chance of separating water from the off-gas.

Figure 10A:
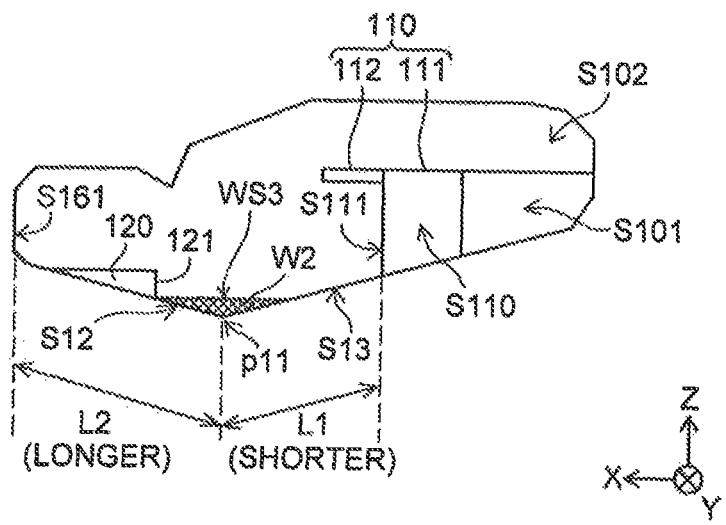
FIG. 10A is a diagram illustrating the location of water accumulated in the reservoir in the state that the fuel cell vehicle is at horizontal position.
Figure 10B:
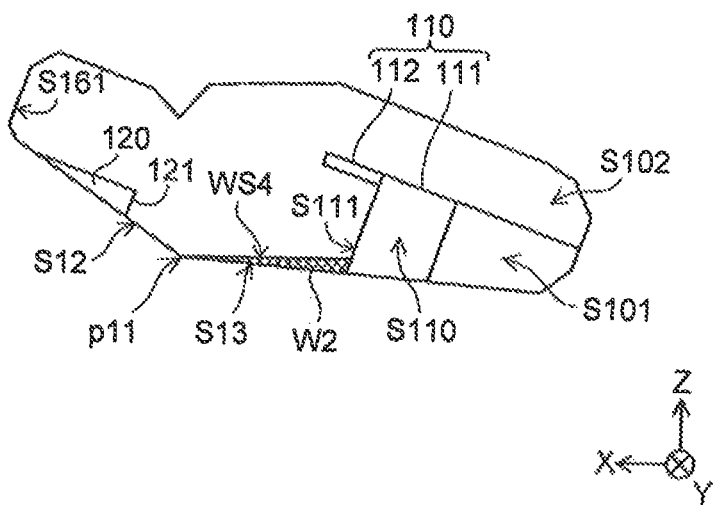
FIG. 10B is a diagram illustrating the location of water accumulated in the reservoir in the state that the fuel cell vehicle is not at horizontal position.

FIGS. 10A and 10B are diagrams illustrating the locations of water accumulated in the gas liquid separator 10 or more specifically in the reservoir 13. FIG. 10A is a diagram illustrating the location of water accumulated in the reservoir 13 in the state that the fuel cell vehicle is at horizontal position. FIG. 10B is a diagram illustrating the location of water accumulated in the reservoir 13 in the state that the fuel cell vehicle is not at horizontal position. FIG. 10A shows the internal state of the cover member 11, for example, when the fuel cell vehicle runs on a horizontal plane. FIG. 10B shows the internal state of the cover member 11, for example, when the fuel cell vehicle runs on an ascending slope.

As shown in FIG. 10A, water W2 separated from the off-gas is accumulated on the bottom of the cover member 11. In this state, liquid level WS3 of the water W2 is located near to the drain outlet 121. The water W2 is thus likely to be discharged from the drain outlet 121.

According to this embodiment, a length L1 between a +X-axis direction end face S111 of the protruded section 110 and the lowermost point p11 is set shorter. More specifically, the length L1 is sot shorter than a length L2 between a +X-axis direction end face S161 of the reservoir 13 or more specifically of the second inner wall portion 160 and the lowermost point p11. Accordingly, as shown in FIG. 10B, when the fuel cell vehicle runs on an ascending slope to cause the water W2 to move toward the protruded section 110, this configuration causes the height of liquid level WS4 of the water W2 or the position of liquid level WS4 in the vertical direction to be located at the upper position, compared with the configuration having the longer length L1. This accordingly allows the liquid level WS4 to be located relatively nearer to the drain outlet 121 compared with the configuration having the longer length L1, thus making the water W2 more likely to be discharged from the drain outlet 121.

Figure 11A:
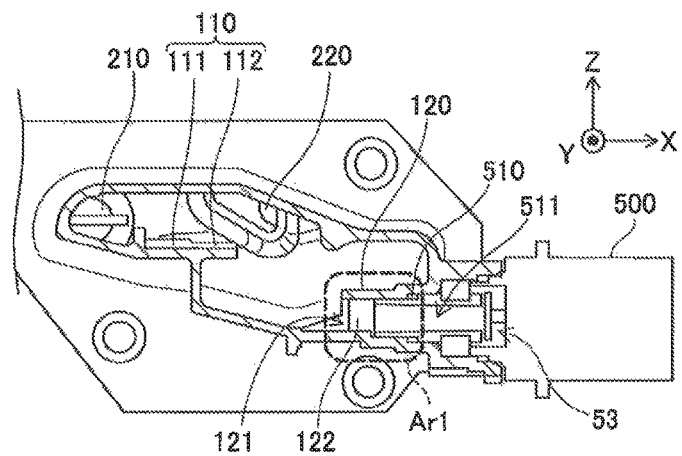
FIG. 11A is a sectional view taken on a line B-B in FIG. 3.
Figure 11B:
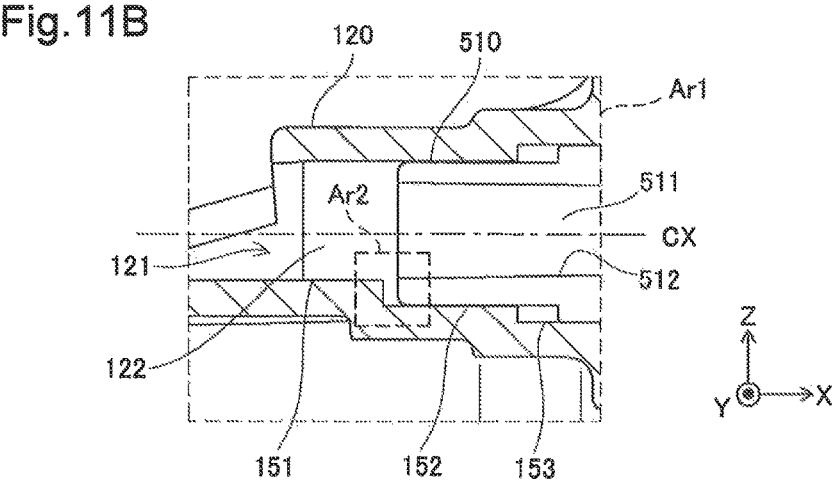
FIG. 11B is an enlarged sectional view illustrating an area Ar1 in FIG. 11A.
Figure 11C:
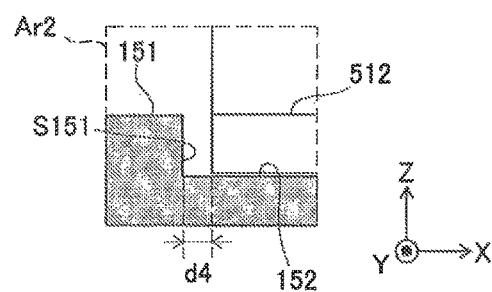
FIG. 11C is an enlarged sectional view illustrating an area Ar2 in FIG. 11B.

FIG. 11A is a sectional view taken on a line B-B in FIG. 3. FIG. 11B is an enlarged sectional view illustrating an area Ar1 in FIG. 11A. FIG. 11C is an enlarged sectional view illustrating an area Ar2 in FIG. 11B. The detailed configuration of part of the valve unit 500 in the +X-axis direction is omitted from the illustration of FIG. 11A.

As shown in FIG. 11A, a drain flow path 122 extended in the X-axis direction is formed inside of the drain flow path-forming portion 120. An −X-axis direction end of the drain flow path 122 is formed as the drain outlet 121. As shown in FIG. 11B, a vertically lower surface of the drain flow path 122 includes three faces, i.e., first bottom face 151, second bottom face 152 and third bottom face 153. The first bottom face 151, the second bottom face 152 and the third bottom face 153 are aligned in this sequence from the drain outlet 121 in the +X-axis direction. The position of the first bottom face 151 in the vertical direction is higher than the position of the second bottom face 152 in the vertical direction. The position of the second bottom face 152 in the vertical direction is higher than the position of the third bottom face 153 in the vertical direction. Accordingly, as shown in FIG. 11B, the position of the bottom face of the drain flow path 122 in the vertical direction descends stepwise along the +X-axis direction.

The valve unit 500 includes a pipe-shaped connecting portion 510 that is extended in the −X-axis direction. A communication flow path 511 is provided inside of the connecting portion 510. In the state that the valve unit 500 is mounted to the gas liquid separator 10, the connecting portion 510 is inserted in the drain flow path 122. The communication flow path 511 is formed as a through hole that passes through inside of the connecting portion 510 along the X-axis direction. The communication flow path 511 has two open ends: −X-axis direction open end communicates with the drain flow path 122 and +X-axis direction open end is located inside of the valve unit 500. The +X-axis direction open end of the communication flow path 511 may be closed by the exhaust drain valve 53. As shown in FIGS. 11B and 11C, a −X-axis direction end of the connecting portion 510 is away by a distance d4 in the +X-axis direction from a wall surface S151 along the Z-axis direction arranged to connect the first bottom face 151 with the second bottom face 152. This aims to suppress the −X-axis direction end of the connecting portion 510 from bumping into the wall surface S151 to interfere with normal mounting of the valve unit 500 to the gas liquid separator 10, due to a production variation of the valve unit 500 or the gas liquid separator 10.

As shown in FIGS. 11B and 11C, the position of a vertically lower surface or bottom face 512 of the communication flow path 511 in the vertical direction is approximately equal to the position of the first bottom face 151 in the vertical direction. This configuration suppresses water from retaining in the drain flow path 122 in the course of discharging water accumulated on the bottom of the reservoir 13 and ensures smooth discharge of water. In the case where the operation of the fuel cell system 5 is stopped in the state that water retains in the drain flow path 122 and the environment of the fuel cell system 5 becomes an extremely low-temperature environment, the water retaining in the drain flow path 122 may be supercooled water. On a start of the fuel cell system 5 in this state, the supercooled water is likely to move toward the exhaust drain valve 53 and to be frozen in the exhaust drain valve 53. The water frozen in the exhaust drain valve 53 is likely to prevent the exhaust drain valve 53 from being opened and result in failure in drainage. Additionally, the water retaining in the drain flow path 122 is likely to be discharged discontinuously from the exhaust drain valve 53 and make unpleasant noise. The fuel cell system 5 of this embodiment, however, suppresses water from retaining in the drain flow path 122 as described above. This accordingly suppresses water from being frozen in the exhaust drain valve 53 to interfere with opening of the exhaust drain valve 53 and also suppresses unpleasant noise.

The first end plate 80 of the embodiment described above corresponds to the subordinate concept of the end plate in the claims. The inclined surface S101 corresponds to the subordinate concept of the inclined surface in the claims.

The gas liquid separator 10 used in the fuel cell system 5 of the embodiment described above is comprised of the gas liquid separator-forming portion 12 that is formed as part of the first end plate 80 and the cover member 11 that is mounted to the first end plate 80. Compared with a configuration that provides a gas liquid separator separately from the first end plate 80, this configuration reduces the total installation space required for the first end plate 80 and the gas liquid separator 10. This accordingly suppresses size expansion of the fuel cell system 5. Additionally, the gas liquid separator 10 is configured by laying these two members over each other. This relatively facilitates production of the internal configuration of the gas liquid separator 10 including the protruded section 110, the first surface S23 and the second surface S24.

The gas inlet and the off-gas outlet 220 of the reservoir 13 are both provided on the gas liquid separator-forming portion 12-side, while the second inner wall portion 160 of the cover member 11 opposed to the gas inlet and the off-gas outlet 220 is formed concave in the −Y-axis direction. This controls the flow of the off-gas to an approximately U-shaped flow in the reservoir 13. This increases the total flow path length of the off-gas in the reservoir 13 and thereby increases the chance of separating water from the off-gas.

The drain outlet 121 is formed in the cover member 11, while the off-gas outlet 220 of the reservoir 13 is formed in the gas liquid separator-forming portion 12. Additionally, the drain outlet 121 is located at the bottom of the reservoir 13, while the off-gas outlet 220 is located in the vicinity of the ceiling of the reservoir 13. This configuration provides a relatively long distance between the drain outlet 121 and the off-gas outlet 220 and suppresses water accumulated in the vicinity of the drain outlet 121 from flowing into the off-gas outlet 220. This enhances the separation efficiency of water from the off-gas.

In the gas liquid separator 10, the protruded section 110 is provided on the cover member 11. This suppresses the off-gas supplied from the gas inlet toward the cover member 11 from linearly moving toward the bottom of the reservoir 13. This suppresses the off-gas from directly colliding with the surface of water accumulated at the bottom of the reservoir 13 and thereby suppresses water from being splashed and flowing into the off-gas outlet 220. Additionally, providing the protruded section 110 suppresses water accumulated in the reservoir 13 from being thrown up by the off-gas flowing in the reservoir 13 and from going to (returning to) the gas inlet.

The protruded section 110 or more specifically the end face S110 of its thick wall portion 111 is away by the distance d2 in the +Y-axis direction from the forming-portion opposing surface S11 that is the −Y-axis direction end face of the entire cover member 11 to form the clearance 190. The bottom face of the clearance 190 is connected with the lower end of the inclined surface S101 that is opposed to the gas inlet. This configuration causes the liquid water flowing down along the inclined surface S101 to go toward the drain outlet 121. Additionally, the bottom face of the clearance 190 or the third surface S13 is formed to be inclined downward along the +X-axis direction. This configuration accelerates the flow of water across the clearance 190 toward the drain outlet 121.

The length L1 between the end face S111 of the protruded section 110 and the lowermost point p11 is set shorter than the length L2 between the +X-axis direction end face S161 of the second inner wall portion 160 and the lowermost point p11. When the fuel cell vehicle runs on an ascending slope, i.e., when the gas liquid separator 10 is inclined in the X-axis direction, this configuration allows the liquid level of water accumulated on the bottom of the reservoir 13 to be located closer to the drain outlet 121, compared with the configuration having the longer length L1. This accelerates discharge of water accumulated in the reservoir 13.

The position of the first bottom face 151 in the vertical direction in the drain flow path 122 is made approximately equal to the position of the bottom face 512 of the communication flow path 511 in the vertical direction in the connecting portion 510. This configuration suppresses water from retaining in the drain flow path 122 in the course of discharging water accumulated on the bottom of the reservoir 13 and ensures smooth discharge of water. This accordingly suppresses water retaining in the drain flow path 122 from interfering with opening of the exhaust drain valve 53 and making unpleasant noise.

The surrounding portion 221 is arranged to surround the off-gas outlet 220. This configuration suppresses water accumulated on the bottom of the reservoir 13 from entering the off-gas outlet 220. The +Y-axis direction end face S221 of the surrounding portion 221 is away in the −Y-axis direction by the distance d1 from the cover opposing surface S80 that is the +Y-axis direction end face of the first end plate 80. When the fuel cell vehicle is inclined from the horizontal position and causes the liquid level of water accumulated on the cover member 11 to rise close to the ceiling surface S103, this configuration suppresses the water from being sucked by the surrounding portion 221. This accordingly suppresses water accumulated on the cover member 11-side from entering the discharge flow path 225. Additionally, the bottom face of the reservoir 13, i.e., the first surface S23 and the third surface S13, and the third wall section 224 of the surrounding portion 221 are formed to be approximately parallel to each other. This configuration provides a relatively long distance between the liquid level of water accumulated on the reservoir 13 and the surrounding portion 221 when the fuel cell vehicle runs on an ascending slope. This accordingly suppresses water from being sucked through the discharge flow path 225 into the off-gas outlet 220.

B. Modifications

B1. Modification 1

Figure 12A:
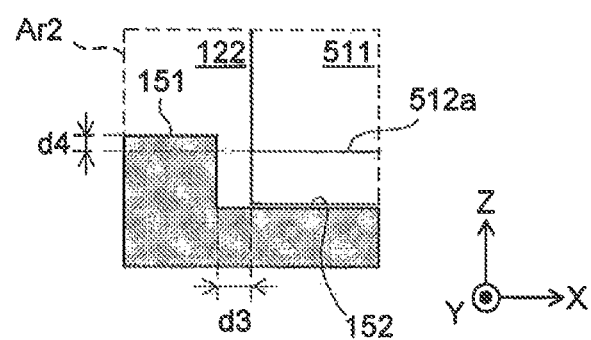
FIG. 12A is a diagram illustrating a first modification of the connecting part of the gas liquid separator and a valve unit.
Figure 12B:
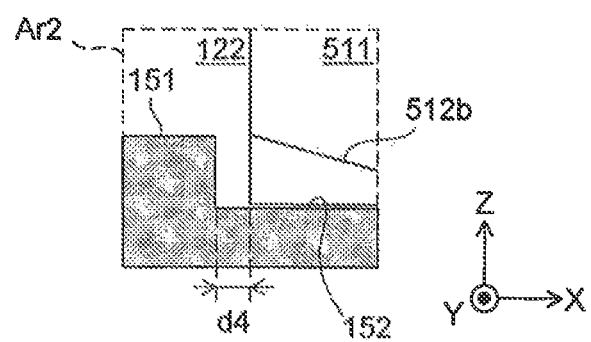
FIG. 12B is a diagram illustrating a second modification of the connecting part of the gas liquid separator and the valve unit.

In the embodiment described above, the position of the first bottom face 151 in the vertical direction in the drain flow path 122 is approximately equal to the position of the bottom face 512 in the vertical direction in the communication flow path 511. The invention is, however, not limited to this configuration. FIG. 12A is a diagram illustrating a first modification of the connecting part of the gas liquid separator 10 and the valve unit. FIG. 12B is a diagram illustrating a second modification of the connecting part of the gas liquid separator 10 and the valve unit.

In the modified configuration of FIG. 12A, the position of the first bottom face 151 in the vertical direction in the drain flow path 122 is above the position of a bottom face 512a in the vertical direction in the communication flow path 511. This modified configuration also suppresses water from retaining in the drain flow path 122 in the course of discharging water accumulated on the bottom of the reservoir 13.

In the modified configuration of FIG. 12B, the communication flow path 511 includes a bottom face 512b that has a −X-axis direction end located at the uppermost position in the vertical direction and is inclined downward along the +X-axis direction. The position of the −X-axis direction end of the bottom face 512b in the vertical direction is approximately equal to the position of the first bottom face 151 in the vertical direction in the drain flow path 122. Accordingly, the position of the first bottom face 151 in the vertical direction is equal to or above the position of any part of the bottom face 512b in the vertical direction.

As understood from the configurations of the above embodiment and these modifications, the invention is applicable to a gas liquid separator in which the position of the first bottom face 151 in the vertical direction in the drain flow path 122 is equal to or is above the position of the bottom face S12 (512a, 512b) in the vertical direction in the communication flow path S11.

B2. Modification 2

In the embodiment described above, the +Y-axis direction end face S221 of the surrounding portion 221 is away in the −Y-axis direction by the distance d1 from the cover opposing surface S80 that is the +Y-axis direction end face of the first end plate 80, and the bottom face of the reservoir 13, i.e., the first surface S23 and the third surface S13, and the third wall section 224 of the surrounding portion 221 are formed to be approximately parallel to each other. According to a modification, only one of these two configurations may be satisfied. Such modification still suppresses water separated from the off-gas from being sucked through the discharge flow path 225 into the off-gas outlet 220.

B3. Modification 3

The configuration of the gas liquid separator 10 of the above embodiment is only illustrative and may be modified and altered in any of various ways. For example, in the above embodiment, the off-gas inlet and the off-gas outlet 220 to and from the gas liquid separator 10 are both formed on the gas liquid separator-forming portion 12. According to a modification, at least one of the off-gas inlet and the off-gas outlet may be formed on the cover member 11. In the above embodiment, the drain flow path-forming portion 120 is formed in the cover member 11 or more specifically at the bottom of the second inner wall portion 160. According to a modification, the drain flow path-forming portion may be formed in the gas liquid separator-forming portion 12 or more specifically at the bottom of the first inner wall portion 202. According to another modification, the protruded section 110 may be omitted from the gas liquid separator 10. In any of these modified configurations, part of the gas liquid separator 10 is formed inside of the first end plate 80. This suppresses size expansion of the fuel cell system. According to another modification, the bottom face of the clearance 190 may not be inclined. At least the presence of the clearance 190 allows the water flowing down along the inclined surface S101 and reaching the lower end of the inclined surface S101 to go toward the drain outlet 121. According to another modification, the length L1 shown in FIG. 10 may be set equal to or larger than the length L2. In the above embodiment, the third wall section 224 that is the lower wall of the surrounding portion 221 is arranged to be approximately parallel to the first surface S23. According to a modification, the third wall section 224 may not be arranged to be approximately parallel to the first surface S23. In this modified configuration, locating the +Y-axis direction end face S221 of the surrounding portion 221 to be away in the −Y-axis direction from the cover opposing surface S80 suppresses water accumulated on the cover member 11-side from flowing into the discharge flow path 225. In the above embodiment, the gas liquid separator-forming portion 12 is formed in the first end plate 80. According to a modification, the gas liquid separator-forming portion 12 may be formed in the second end plate 81, in place of the first end plate 80. In this modified configuration, the hydrogen gas supply system and the hydrogen gas discharge system may be provided on the second end plate 81-side, and through holes may be provided in the second end plate 81 and the terminal plate 83 to communicate with the manifold for the flow of the anode reactive gas.

The invention is not limited to any of the embodiment and its modifications described above but may be implemented by a diversity of configurations without departing from the scope of the invention. For example, the technical features of any of the embodiment and its modifications corresponding to the technical features of the respective aspects described in SUMMARY may be replaced or combined appropriately in order to solve part or all of the problems described above or in order to achieve part or all of the advantageous effects described above. Any of the technical features may be omitted appropriately unless the technical feature is described as essential herein.

What is claimed is:

1. A gas liquid separator that is configured to separate water included in an off-gas discharged from a fuel cell and discharge the separated water, wherein the fuel cell comprises a cell stack having a plurality of stacked unit cells and an end plate placed on an outer side of the cell stack in a stacking direction of the plurality of stacked unit cells, the gas liquid separator comprising:
a gas liquid separator-forming portion that is formed in the end plate to have an opening at an opposite end face of the end plate in the stacking direction on an opposite side to the cell stack and that constitutes part of the gas liquid separator; and
a cover member that is located to cover the opening of the gas liquid separator-forming portion and that constitutes a part of the gas liquid separator, wherein
the gas liquid separator-forming portion includes
a first inner wall portion that includes an off-gas outlet formed therein, that is provided to serve as a flow path of the off-gas and form part of a reservoir in which the water separated from the off-gas is accumulated, and that is configured to be connected with the opening and to be formed concave in a thickness direction of the end plate and
a surrounding portion that is protruded from the first inner wall portion along a first direction from the gas liquid separator-forming portion toward the cover member to surround the outlet, an end face of the surrounding portion in the first direction is away in an opposite direction to the first direction from an end face of the end plate in the first direction,
the cover member includes
a second inner wall portion that is formed concave in a thickness direction of the cover member to be connected with an opening of the cover member formed on a surface of the cover member opposed to the gas liquid separator-forming portion, that is located to be opposed to the first inner wall portion in the stacking direction and that is combined with the first inner wall portion to form the reservoir,
a drain flow path-forming portion that is configured to form a drain flow path to discharge water accumulated in the reservoir, the drain flow path includes a drain outlet located near to the bottom face of the second inner wall portion to be exposed to inside of the reservoir, and
an inclined surface formed at the second wall portion of the cover member,
the second wall portion of the cover member is connected with the drain outlet, and
the inclined surface is gradually inclined downward along an opposite direction of the first direction.

2. The gas liquid separator according to claim 1, wherein an off-gas inlet of the gas liquid separator is formed in the first inner wall portion.

3. A gas liquid separator that is configured to separate water included in an off-gas discharged from a fuel cell and discharge the separated water, wherein the fuel cell comprises a cell stack having a plurality of stacked unit cells and an end plate placed on an outer side of the cell stack in a stacking direction of the plurality of stacked unit cells, the gas liquid separator comprising:
a gas liquid separator-forming portion that is formed in the end plate to have an opening at an opposite end face of the end plate in the stacking direction on an opposite side to the cell stack and that constitutes part of the gas liquid separator; and
a cover member that is located to cover the opening of the gas liquid separator-forming portion and that constitutes a part of the gas liquid separator, wherein
the gas liquid separator-forming portion includes
a first inner wall portion that includes an off-gas outlet formed therein, that is provided to serve as a flow path of the off-gas and form part of a reservoir in which the water separated from the off-gas is accumulated, and that is configured to be connected with the opening and to be formed concave in a thickness direction of the end plate, and
a surrounding portion that is protruded from the first inner wall portion along a first direction from the gas liquid separator-forming portion toward the cover member to surround the outlet, wherein
the surrounding portion has an outer surface including a portion that is located on a vertically lower side than other portion of the outer surface in a state that the gas liquid separator is set and that is approximately parallel to a bottom face of the reservoir,
the cover member includes
a second inner wall portion that is formed concave in a thickness direction of the cover member to be connected with an opening of the cover member formed on a surface of the cover member opposed to the gas liquid separator-forming portion, that is located to be opposed to the first inner wall portion in the stacking direction and that is combined with the first inner wall portion to form the reservoir, a drain flow path-forming portion that is configured to form a drain flow path to discharge water accumulated in the reservoir, the drain flow path includes a drain outlet located near to the bottom face of the second inner wall portion to be exposed to inside of the reservoir, and an inclined surface formed at the second wall portion of the cover member, the second wall portion of the cover member is connected with the drain outlet, and the inclined surface is gradually inclined downward along an opposite direction of the first direction.

4. A fuel cell system comprising:

a fuel cell including a cell stack that includes a plurality of stacked unit cells and an end plate placed on an outer side of the cell stack in a stacking direction of the plurality of stacked unit cells; and a gas liquid separator that is configured to separate water included in an off-gas discharged from the fuel cell and discharge the separated water, wherein the gas liquid separator includes a gas liquid separator-forming portion that is formed in the end plate to have an opening at an opposite end face of the end plate in the stacking direction on an opposite side to the cell stack and that constitutes part of the gas liquid separator and a cover member that is located to cover the opening of the gas liquid separator-forming portion and that constitutes a part of the gas liquid separator, and the gas liquid separator-forming portion includes a first inner wall portion that includes an off-gas outlet formed therein, that is provided to serve as a flow path of the off-gas and form part of a reservoir in which the water separated from the off-gas is accumulated, and that is configured to be connected with the opening and to be formed concave in a thickness direction of the end plate and a surrounding portion that is protruded from the first inner wall portion along a first direction from the gas liquid separator-forming portion toward the cover member to surround the outlet, an end face of the surrounding portion in the first direction is away in an opposite direction to the first direction from an end face of the end plate in the first direction, the cover member includes a second inner wall portion that is formed concave in a thickness direction of the cover member to be connected with an opening of the cover member formed on a surface of the cover member opposed to the gas liquid separator-forming portion, that is located to be opposed to the first inner wall portion in the stacking direction and that is combined with the first inner wall portion to form the reservoir, a drain flow path-forming portion that is configured to form a drain flow path to discharge water accumulated in the reservoir, the drain flow path includes a drain outlet located near to the bottom face of the second inner wall portion to be exposed to inside of the reservoir, and an inclined surface formed at the second wall portion of the cover member, the second wall portion of the cover member is connected with the drain outlet, and the inclined surface is gradually inclined downward along an opposite direction of the first direction.

5. A fuel cell system comprising:

a gas liquid separator-forming portion that is formed in the end plate to have an opening at an opposite end face of the end plate in the stacking direction on an opposite side to the cell stack and that constitutes part of the gas liquid separator; and a cover member that is located to cover the opening of the gas liquid separator-forming portion and that constitutes a part of the gas liquid separator, wherein the gas liquid separator-forming portion includes a first inner wall portion that includes an off-gas outlet formed therein, that is provided to serve as a flow path of the off-gas and form part of a reservoir in which the water separated from the off-gas is accumulated, and that is configured to be connected with the opening and to be formed concave in a thickness direction of the end plate; and a surrounding portion that is protruded from the first inner wall portion along a first direction from the gas liquid separator-forming portion toward the cover member to surround the outlet, wherein the surrounding portion has an outer surface including a portion that is located on a vertically lower side than other portion of the outer surface in a state that the gas liquid separator is set and that is approximately parallel to a bottom face of the reservoir, the cover member includes a second inner wall portion that is formed concave in a thickness direction of the cover member to be connected with an opening of the cover member formed on a surface of the cover member opposed to the gas liquid separator-forming portion, that is located to be opposed to the first inner wall portion in the stacking direction and that is combined with the first inner wall portion to form the reservoir, a drain flow path-forming portion that is configured to form a drain flow path to discharge water accumulated in the reservoir, the drain flow path includes a drain outlet located near to the bottom face of the second inner wall portion to be exposed to inside of the reservoir, and an inclined surface formed at the second wall portion of the cover member, the second wall portion of the cover member is connected with the drain outlet, and the inclined surface is gradually inclined downward along an opposite direction of the first direction.

* * * * *